United States Patent [19]

Cini et al.

[11] Patent Number: 4,958,251
[45] Date of Patent: Sep. 18, 1990

[54] GUARDED ELECTRONIC CIRCUIT FROM REVERSAL OF ITS SUPPLY BATTERY POLARITY

[75] Inventors: Carlo Cini, Cornaredo; Bruno Murari, Monza, both of Italy

[73] Assignee: SGS-Thomson Microelectronics S.r.l., Milan, Italy

[21] Appl. No.: 370,445

[22] Filed: Jun. 23, 1989

[30] Foreign Application Priority Data

Jul. 5, 1988 [IT] Italy .................. 21235 A/88

[51] Int. Cl.⁵ .............................. H02M 3/12
[52] U.S. Cl. ........................ 361/84; 307/127
[58] Field of Search ............ 361/84, 77, 88, 86; 307/10.7, 127

[56] References Cited

U.S. PATENT DOCUMENTS 4,839,769  6/1989  Soo et al. .................. 361/84

Primary Examiner—Derek S. Jennings
Attorney, Agent, or Firm—Rosen, Dainow & Jacobs

[57] ABSTRACT

A guarded electronic circuit from reversal of its supply battery polarity comprises a MOS power transistor connected between one pole of the battery and ground, to drive an electric load to ground, and a second, protection MOS transistor connected between the pole and the first transistor; said transistors, which are both provided with respective inherent diodes between the source and the drain, have their related drain electrodes connected together. The resulting circuit is self-protected against possible reversal of the polarity of the battery to which it is connected, and can protect the electric load driven thereby.

12 Claims, 1 Drawing Sheet

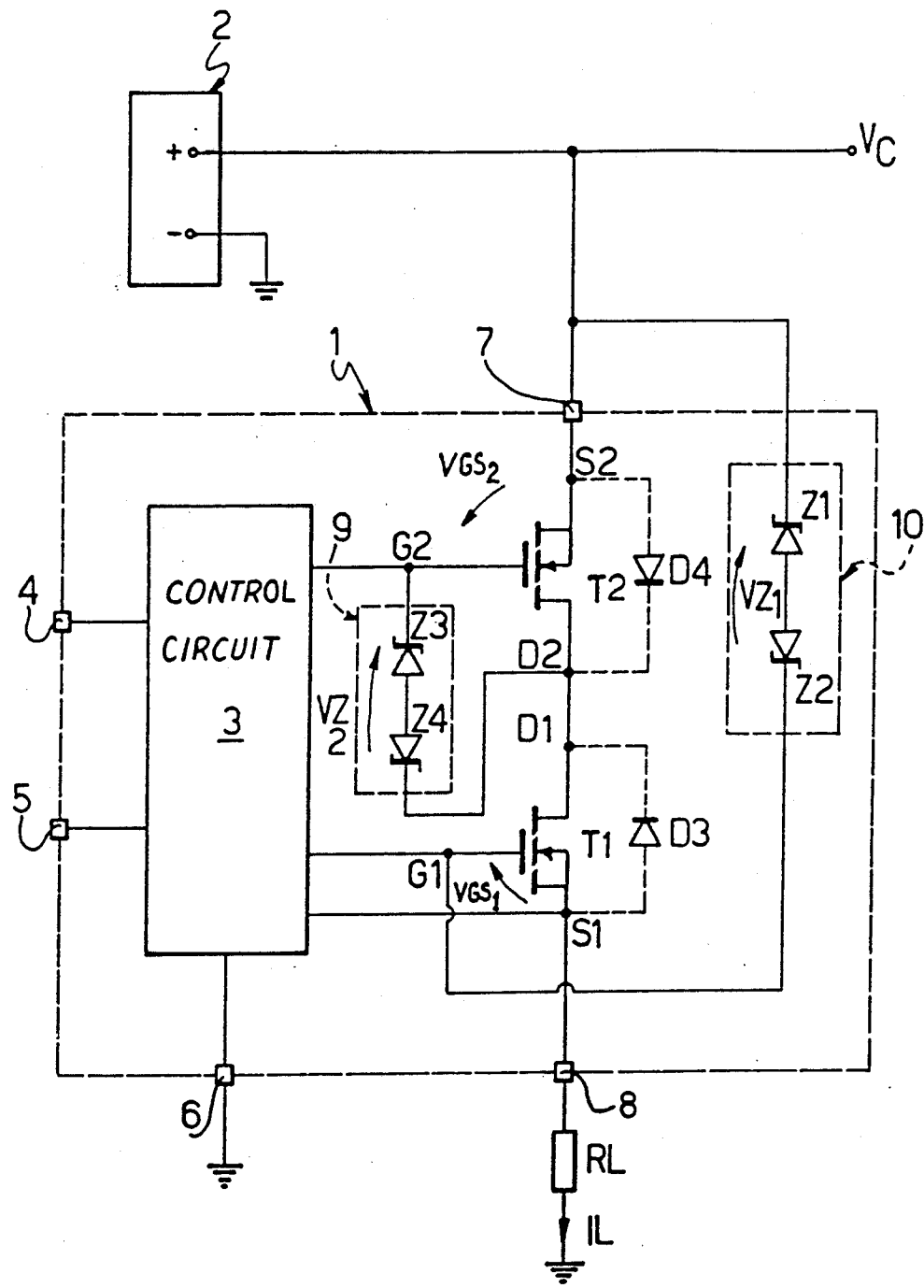

GUARDED ELECTRONIC CIRCUIT FROM REVERSAL OF ITS SUPPLY BATTERY POLARITY

DESCRIPTION

This invention relates to an electronic circuit guarded from reversal of its supply battery polarity, being of a type which comprises a power transistor connected between one pole of the battery and ground, to drive an electric load to ground.

BACKGROUND OF THE INVENTION

It is a well-recognized fact that car manufacturing procedures call for the addition of an electric system powering battery to each car during the final stages of the electric system installation process and assembly of the electric loads connected therein.

The various electric loads, such as lights, actuators, and the like, are usually driven between a positive supply pole and ground via an electronic control circuit.

Since it is not unlikely for the cables to be occasionally misled which interconnect the supply to such circuits, there exists a demand for an ability to still have the supply battery installed even where polarity has been reversed without this endangering said integrated circuits.

This need also arises, from the likelihood that just the battery connections are reversed by mistake, and becomes specially acute where an integrated circuit includes power actuators including, inter alia, inherent transistors, for which no limiting resistive components can be provided in the supply line since these would lower the supply voltage in consequence of the voltage drop thereacross.

To meet the above demand, it has been proposed that a unidirectional component, specifically a diode, be connected between the positive supply pole and the electronic control circuit to protect such an integrated circuit in the event that the battery polarity is reversed.

While being advantageous cost-wise, this prior approach has a drawback in that the voltage drop Vd across the diode lowers the voltage available to the electric load to be driven, and that the overall efficiency of the system deteriorates due to the power requirements being increased by an amount equal to the product of the voltage Vd across the diode multiplied by the current IL flowing through the load.

SUMMARY OF THE INVENTION

The technical problem that underlies this invention is to provide an electronic circuit having such structural and performance characteristics as to overcome the cited drawbacks with which the prior art is beset.

This problem is solved by a circuit as indicated being characterized in that it comprises a second, protection transistor connected between said pole and the first transistor.

SUMMARY OF DRAWINGS

The features and advantages of a circuit according to the invention will become apparent from the following detailed description of an embodiment thereof, given by way of illustration and not of limitation with reference to the accompanying drawing.

Shown in the drawing is a schematic diagram of the inventive circuit.

DETAILED DESCRIPTION OF PREFERRED EMBODIMENTS

With reference to the drawing view, generally and schematically indicated at 1 is a circuit, embodying this invention, which is guarded from reversal of a supply battery 2 polarity.

The circuit 1 is of the integrated kind and comprises a control circuit portion 3, known per se, which is connected to an input pin 4 and to a pair of output pins 5 and 6, wherein the pin 6 is grounded.

The circuit 1 also comprises a further input pin 7, connected to a positive supply pole Vc of the battery 2, and a further output pin 8 connected to one end of a resistor RL having the other end connected to ground.

That resistor RL is representative of an electric load driven to ground by means of the circuit 1.

The circuit 1 incorporates a first power transistor T1 of the enhancement, N-channel MOS type, which has its gate G1 and source S1 connected to the circuit portion 3. The source S1 is also connected to drive the load RL via the output pin 8.

The transistor T1 includes an inherent diode D3, between the source S1 and the drain D1, which is biased forwardly toward the source S1.

According to the invention, a second transistor T2, also of the N-channel MOS power type, is incorporated to the circuit 1, with its source S2 and drain D2 electrodes respectively connected to the positive pole Vc, through the input pin 7, and to the drain D1 of the first transistor T1. The gate G2 of the second transistor T2 is in turn connected to the circuit portion 3.

The transistor T2 also has an inherent diode D4 between the source S2 and the drain D2, and is biased forwardly toward the source S2.

In addition, the circuit 1 is provided with devices 9 and 10 for protection against possible positive or negative overvoltages from the battery 2. The device 10 comprises a pair of Zener diodes Z1 and Z2, connected serially to each other and in push-pull configuration between the positive pole Vc and the gate G1 of the first transistor T1. The device 9 comprises, in turn, a pair of Zener diodes Z3 and Z4 interconnected in push-pull configuration, between the gate G2 and the drain D2 of the second transistor T2.

The second transistor T2 is conducting at all times the supply voltage Vc appears, and will guard the integrated circuit 1 in all those cases where the polarity of the battery 2 is reversed.

In operation of the circuit 1, when the control circuit 3 drives the gate G1 to turn on the first transistor T2, --; a current IL flows through the load RL which is supplied from the first transistor T1 via the second protection transistor T2.

On the polarity of the battery 2 being reversed, the second transistor will change to a break or non-conducting state and protect both the circuit 1 and the load RL.

Advantageously, the voltage drop V across the second transistor may be made as small as desired, since it results from the product of the inherent resistance of the transistor T2 multiplied, by the load current IL flowing therethrough. In view of the fact that the value of this resistance is tied inversely to the silicon area occupied by that second transistor in the integrated circuit 1, this resistive value may be made quite small by increasing the surface area occupied by the transistor T2 and consequently reducing the voltage drop thereacross and the amount of electric power used up.

Thus, the circuit of this invention has a major advantage in that it can protect itself against any reversals in the polarity of the supply battery to which it is connected, while also protecting the electric load driven thereby.

This circuit also has an outstandingly simple structure, may be readily implemented as an integrated circuit, and is characteristically endowed with very small power dissipation.

We claim:

1. An electronic circuit guarded against reversal of its supply battery polarity, comprising a first power transistor connected between one pole of said battery and in series with an electric load connected to ground and functioning to drive said electric load to ground, and a second protection transistor connected in series between said pole and the first transistor and becoming non-conducting upon a reversal of the battery polarity.

2. A circuit according to claim 1, characterized in that said second transistor is of its MOS type with the source connected to said pole and its drain connected to the first power transistor.

3. A circuit according to claim 1, characterized in that the first power transistor and the second transistor are both of the MOS type with respective drain electrodes connected to each other, each transistor having a corresponding inherent diode between its drain and its source.

4. A circuit according to claim 1, characterized in that it comprises devices for protection against voltage fluctuations from the battery and being respectively formed by a first pair of Zener diodes serially connected between said pole and the gate of the first transistor and a second pair of Zener diodes serially connected between the gate and the drain of the second transistor.

5. A circuit according to claim 1, characterized in that said second transistor is a MOS-type power transistor.

6. In a circuit comprising a power source, a grounded electric load, and a first power transistor connected in series between the power source and the load and conducting current through the load when activated, means for guarding the circuit and the load against an inadvertent reversal of the power source polarity, said guarding means comprising a second power transistor connected directly in series with the power source and the first transistor and being in a conductive state when the power source polarity is correct and being in a non-conductive state when the power source polarity is reversed.

7. The circuit of claim 6, wherein the first and second transistors are MOS transistors having source, drain and gate electrodes, the source-drains of the first and second transistors being connected directly in series between the power source and the load without any intervening components that would tend to lower the voltage available to drive the load.

8. The circuit of claim 7, further comprising a control circuit connected to the gates of both the first and second power transistors.

9. The circuit of claim 8, further comprising a first pair of Zener diodes serially connected between the gate and drain of the second transistor and a second pair of Zener diodes serially connected between the gate of the first transistor and the power source.

10. The circuit of claim 7, wherein the drains of the first and second transistors are directly connected.

11. The circuit of claim 10, wherein each transistor has an inherent diode connected between its source and drain and poled from source to drain.

12. The circuit of claim 9, wherein the first and second power transistors, the control circuit, and the Zener diodes are incorporated in an integrated circuit.

* * * * *